L. R. HIBBARD.
DIFFERENTIAL AXLE DEVICE.
APPLICATION FILED MAR. 2, 1909.
928,198.
Patented July 13, 1909.
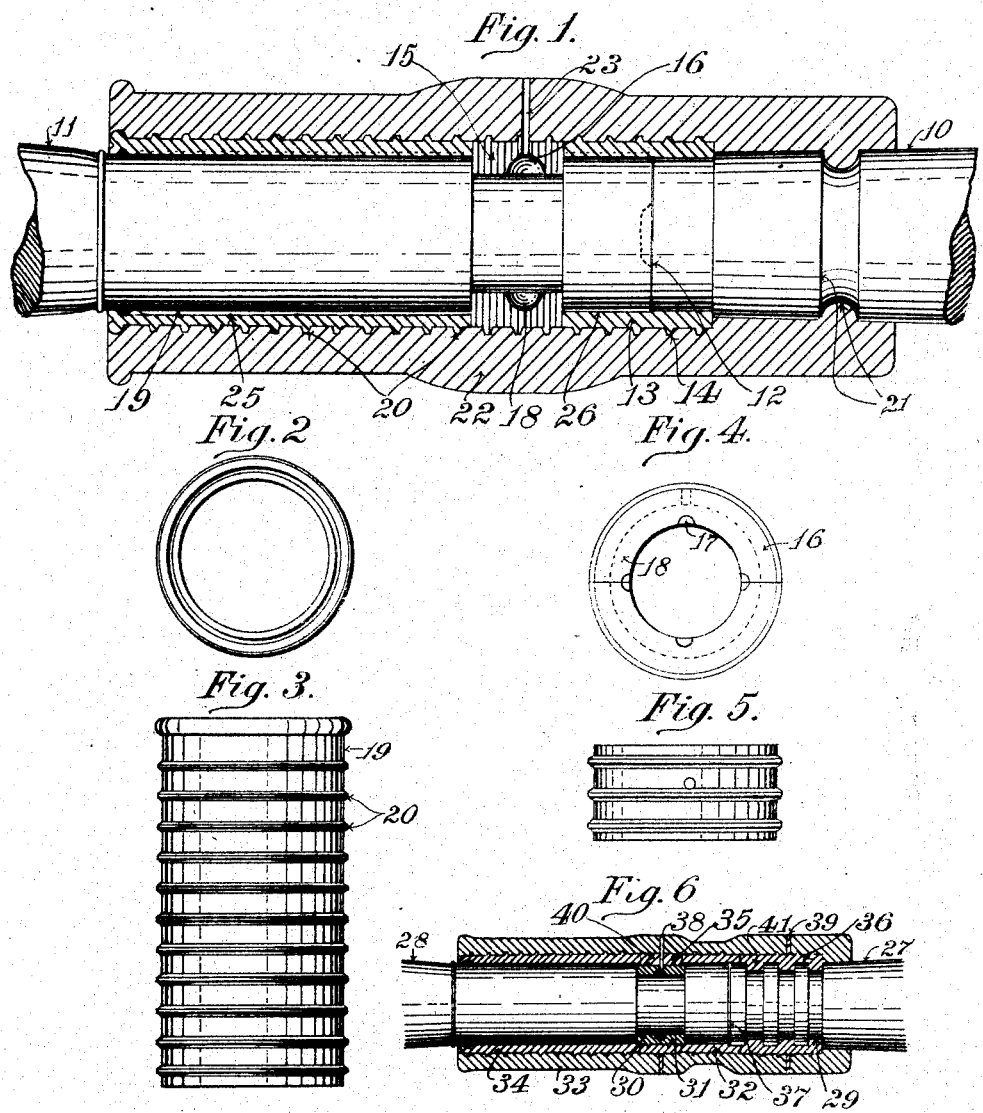

UNITED STATES PATENT OFFICE.

LOUIS R. HIBBARD, OF LOS ANGELES, CALIFORNIA, ASSIGNOR OF ONE-FOURTH TO CHARLES BENEDICT AND ONE-FOURTH TO J. HERBERT KNAPP, BOTH OF LOS ANGELES, CALIFORNIA.

DIFFERENTIAL AXLE DEVICE.

No. 928,198.      Specification of Letters Patent.      Patented July 13, 1909.

Application filed March 2, 1909. Serial No. 480,914.

*To all whom it may concern:*

Be it known that I, LOUIS R. HIBBARD, a citizen of the United States, residing in the city of Los Angeles, county of Los Angeles, and State of California, have invented new and useful Improvements in Differential Axle Devices and in the Processes of Making the Same, of which the following is a specification.

In the construction of differential axle devices it is customary to connect the parts of the axles by means of a box or jacket, the parts of which are secured together by bolt screws or rivets or by forcing the parts together under great pressure so that they would be retained in engagement by friction. Where bolts, screws or rivets are used to hold the parts together, they are liable to crystallize and break thereby rendering the device unsafe. Where great pressure is required to unite parts telescopically, considerable expense is involved in procuring the machinery for such purpose, and the parts require considerable machine work to fit them for their intended use.

It is the object of my invention to construct a differential axle device of easily formed parts with a minimum amount of machine work to fit them for their intended use and then to unite the parts in working relation by a jacket cast around the same of metal of sufficient strength to produce a useful axle. I accomplish this object by the process described herein and illustrated in the accompanying drawings which show so much of the axle as is necessary to illustrate my process.

In the drawings, Figure 1 is a side elevation of the parts forming the differential axle device with certain of the parts in central longitudinal section. Fig. 2 is an end elevation of a sleeve which surrounds one of the ends of the two parts forming the axle. Fig. 3 is a side elevation of the same sleeve. Fig. 4 is an end elevation of the securing or end thrust ring. Fig. 5 is a side elevation of the securing ring. Fig. 6 shows a slight modification.

10 is one of the ends and 11 is the other end of a divided axle. These parts meet at 12 and may or may not be reduced in size as desired. Surrounding the meeting ends of these parts is a central sleeve 13 which is preferably provided externally with a plurality of ribs 14. In the drawings I have shown five, but any other number as desired may be used. This sleeve is preferably made of cast iron, and the interior is smoothly bored and snugly fits the ends of the axle. One of the ends, shown in the drawing as the end of part 11 has a working fit within the sleeve. The other end of the sleeve preferably snugly fits the other part of the axle. At the end of this sleeve in the part of the axle marked 11 is an annular retaining groove 15 in which is received an annular securing ring 16 which is longitudinally divided as best shown in Fig. 4, so that the parts can be separated and placed in the groove 15 when it is desired to assemble the parts. This ring has a working fit in the retaining groove and its external diameter is preferably the same as that of sleeve 13. It is provided with transverse lubricating grooves 17 and a longitudinal lubricating groove 18. Surrounding the part 11 just beyond groove 15 is a bearing sleeve 19 also of cast metal, which is provided with external annular ribs 20 of which there may be any desired number. In the part 10 of the axle a short distance from sleeve 13 I provide an annular groove 21. The parts being thus prepared are assembled as shown in Fig. 1 within a suitable mold and a metal jacket 22 is cast around the parts. This jacket will fuse to the outside of sleeves 13 and 19 and also upon the end of axle 10 exterior sleeve 13, suitable fluxing material being first put on the outside of these parts to cause the jacket to fuse thereto. By this construction a cheap efficient differential axle device is provided. The jacket being cast around and being fused to the sleeves and the securing ring and to the other portion of the axle makes an absolutely secure construction, which is not subject to the danger of accidentally coming apart owing to the breaking of binding screws or bolts. After casting jacket 22 an oiling channel 23 may be bored through the jacket and securing ring to an annular oil channel 18 in the interior of the ring. The securing ring may have transverse oil channels 17 and oil channel 26 may be provided in the sleeves.

In Fig. 6 I have shown a slight modification of my differential axle device. In this construction 27 and 28 are the divided ends of the axle. The end 27 is provided with a plurality of grooves 29 and the end 28 is provided with a securing groove 30. The split securing ring 31 is formed of the same external diameter as the part of the axle 28. Bearing sleeve 32 only extends as far as the end of the part 28. Jacket 33 is cast with the bearing sleeve 32 and 34 occupying the respective positions they occupy when the parts are assembled. An annular groove 35 which registers with the securing ring when the parts are assembled is cored in the jacket. A second annular groove 36 is cored in the jacket so as to register with and surround the annular grooves 29. The end of the jacket has a tight fit with the part 27 when assembled for use, and a thin disk 37 of tempered steel may be placed between the ends of the divided axle when the parts are assembled. That part of the jacket which surrounds the part 27 where it contacts with the same is in close contact. Holes 38 and 39 are provided in the jacket through which cast metal is introduced. The parts are assembled as shown in Fig. 6, and cast metal 40 would be poured through hole 38 and would fuse with the jacket and with the securing ring. Cast metal 41 would be poured through hole 39 and would fuse with the jacket and thereby unite the same to the end 27 of the axle. By this construction it will be observed that the main portion of the jacket may be cast before the parts are assembled. If desired bearing sleeves 32 and 34 could be cast integral with the jacket, I prefer, however, to have them cast of cast iron and the jacket made of cast steel, as thereby better wearing surfaces are provided where the parts contact with the axle, and cast steel gives greater strength to the main part of the jacket.

Having described my invention what I claim is:

1. The herein described process of forming a differential axle device which consists in preparing the divided ends of the axle with suitable grooves, preparing suitable sleeves to slip over the ends of the axle, preparing a securing ring adapted to fit into one of the grooves of the axle, then assembling the parts in their proper relation and then inclosing the parts in a suitable mold, and casting a metal jacket around the same.

2. The herein described process of forming a differential device which consists in preparing the divided ends of the axle with suitable grooves one of said ends having a securing ring groove, then preparing a divided securing ring, then preparing a jacket to slip over both ends of the divided axle, said jacket having annular grooves which register one with the securing ring groove and the other with all the grooves on the other end of the axle, then assembling the parts in their proper relation and pouring cast metal into the jacket at the several grooves therein.

3. The herein described process of forming a differential axle device which consists in preparing the divided ends of the axle with suitable grooves, preparing suitable sleeves to slip over one of the ends of the axle, preparing a divided securing ring adapted to fit into the groove in that part of the axle provided with sleeves, then casting a jacket around the sleeves with annular grooves on the interior thereof registering with the securing ring groove and with the grooves in the other part of the axle, then fitting the jacket to slip upon the end of the axle not containing the securing ring groove, then assembling the parts in their proper relation and pouring cast metal into the jacket around the securing ring, and around the grooves in the other part of the axle.

In witness that I claim the foregoing I have hereunto subscribed my name this 22nd day of February, 1909.

LOUIS R. HIBBARD.

Witnesses:
C. E. HARPHAM,
S. B. AUSTIN.